United States Patent [19]
Nakao

[11] Patent Number: 5,974,797
[45] Date of Patent: Nov. 2, 1999

[54] HYDRAULIC ACTUATOR PACKAGE

[75] Inventor: Hirotoshi Nakao, Tochigi, Japan

[73] Assignee: Tokimec Inc., Tokyo, Japan

[21] Appl. No.: 08/944,443

[22] Filed: Oct. 6, 1997

[30] Foreign Application Priority Data

Oct. 8, 1996 [JP] Japan .................................. 8-267095

[51] Int. Cl.⁶ .................................................. F16D 31/02
[52] U.S. Cl. ....................... 60/413; 60/458; 60/448
[58] Field of Search ............................. 60/413, 414, 415, 60/455, 458, 448, 487

[56] References Cited

U.S. PATENT DOCUMENTS

| | | | |
|---|---|---|---|
| 2,714,291 | 8/1955 | Gleeson | 60/458 X |
| 3,309,870 | 3/1967 | Pinkerton | 60/458 X |
| 3,643,433 | 2/1972 | Widmaier | 60/486 |
| 3,681,919 | 8/1972 | Forster | 60/458 |
| 4,210,034 | 7/1980 | Younger | 60/458 X |
| 4,366,671 | 1/1983 | Chichester | 60/458 X |
| 4,633,665 | 1/1987 | Buter et al. | 60/413 |
| 5,146,748 | 9/1992 | Okada | 60/454 |
| 5,341,311 | 8/1994 | Liebler | 60/448 X |
| 5,412,947 | 5/1995 | Hirose | 60/487 X |
| 5,802,931 | 9/1998 | Louis | 60/487 X |

FOREIGN PATENT DOCUMENTS

| | | | |
|---|---|---|---|
| 8-244682 | 9/1996 | Japan . | |
| 2100363 | 12/1982 | United Kingdom | 60/413 |
| 2212562 | 7/1989 | United Kingdom | 60/458 |

*Primary Examiner*—John E. Ryznic
*Attorney, Agent, or Firm*—Armstrong, Westerman, Hattori, McLeland & Naughton

[57] ABSTRACT

A hydraulic actuator package of the present invention comprises a variable displacement hydraulic motor for driving an inertia object with acceleration or deceleration, a speed sensor for detecting a speed of an output shaft of the hydraulic motor, a control valve for continuously varying the capacity of the hydraulic motor, which are integrally provided inside or outside a casing of the hydraulic motor, and an assembling body formed by integrally assembling an accumulator serving as a hydraulic source of the hydraulic motor and an airtight tank into a common pedestal, said assembling body being mounted on said casing, first and second ports of the hydraulic motor communicating with the accumulator and the airtight tank in the casing and the pedestal, and first and second external connection ports being defined in the pedestal or the casing, and capable of being connected to the first and second ports from the outside.

7 Claims, 6 Drawing Sheets

HYDRAULIC ACTUATOR PACKAGE

BACKGROUND OF THE INVENTION

1. Field of the Invention

The present invention relates to a hydraulic actuator system adapted for the repetitive movement of a load having a given mass such as a conveyor or an anti-rolling apparatus of or a vessel, particularly to a hydraulic actuator package having a small size and light weight which is formed by integrating each component unit of the hydraulic actuator system.

2. Description of the Related Art

A hydraulic actuator system of this type is disclosed in JP-A 8-244682 (an anti-rolling apparatus of a vessel) which has been previously proposed by the applicant.

Figure 6:
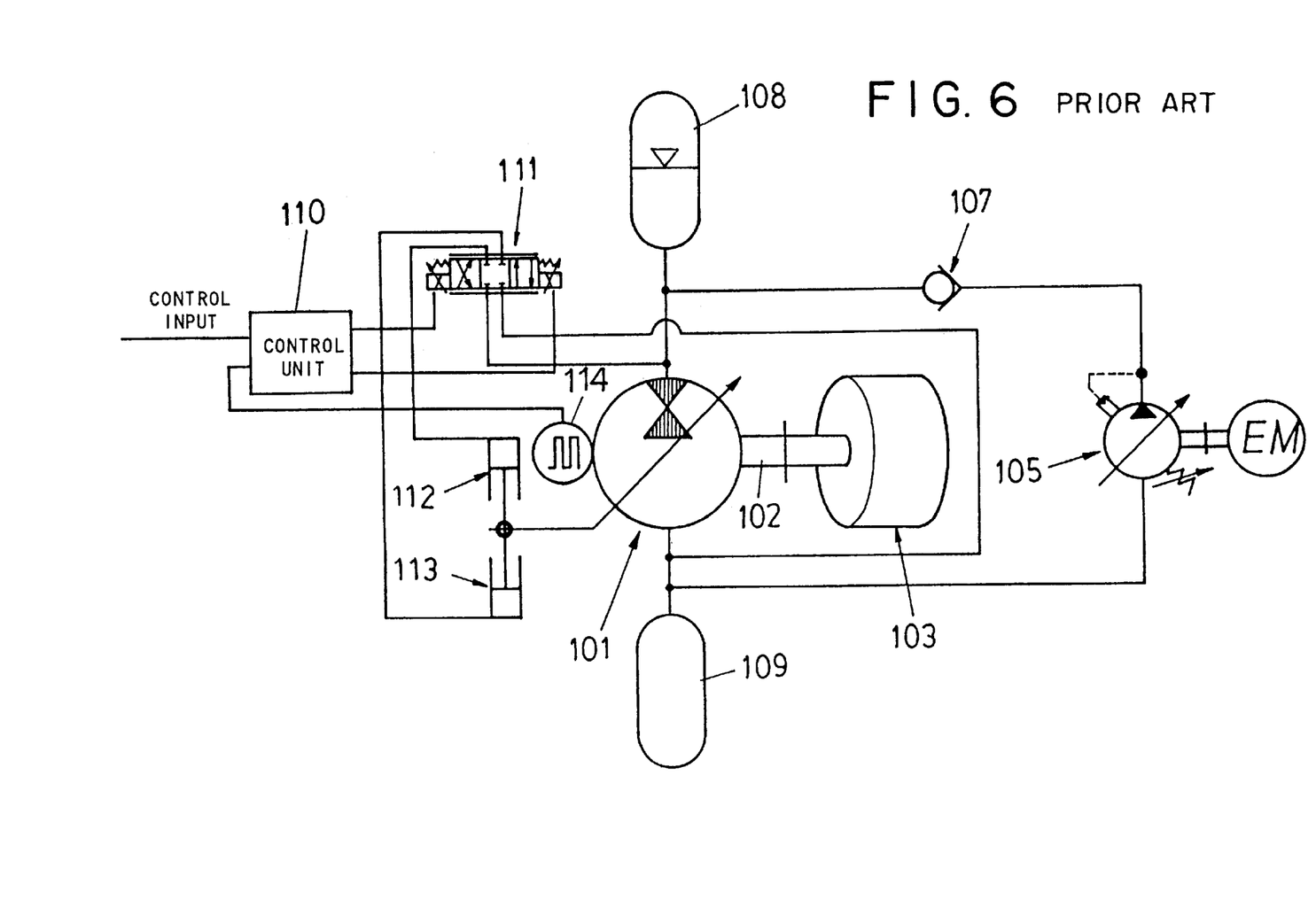
FIG. 6 is a circuit diagram showing an example of a conventional hydraulic actuator system (secondary control system).

This system comprises, as shown in FIG. 6, a variable displacement hydraulic motor 101 which uses liquid such as oil as a power medium, a weight 103 which is an inertia object and is mechanically connected to a main shaft 102 of the hydraulic motor 101, an auxiliary pump 105 for supplying operation fluid under high pressure to the hydraulic motor 101 and an accumulator 108 serving as a hydraulic source of the hydraulic motor 101 by way of a check valve 107, a tank 109 to which the operation fluid from the auxiliary pump 105 and that from the hydraulic motor 101 returns, and first and second displacement control pistons 112 and 113 which operate by way of a closed center type control valve 111 in response to an instruction issued from a control unit 110.

A pulse encoder 114 serves as a speed sensor for generating a pulse signal in response to a revolution speed of the main shaft 102 of the hydraulic motor 101, and it feeds back the pulse signal to the control unit 110. The control unit 110 outputs an operation signal to the control valve 111 so that the detected value of the shaft speed which is obtained by subjecting the pulse signal to an F/V conversion conforms to a speed instruction value, thereby varying the inclination of an inclination plate of the hydraulic motor 101 to control the capacity of the hydraulic motor 101.

With such a construction, a rolling of a vessel is detected by a sensor such as an acceleration speedometer (not shown) provided in the vessel, and a control instruction to move the weight 103 in the direction to attenuate the amount of detected rolling is supplied to the control unit 110. At this time, since an instantaneous large power needed for driving the weight 103 is discharged from the accumulator 108, the operation fluid to be supplied from the auxiliary pump 105 becomes small power.

Since a kinetic energy of the weight 103 can be collected by the accumulator 108 when the speed thereof is reduced, it is possible to drastically save energy compared with a normal hydraulic driving apparatus which changes braking energy into heat and discharges the heat. Such a hydraulic actuator system is referred to as a secondary control system.

In FIG. 6, although the weight 103 is mechanically connected to the main shaft 102 of the hydraulic motor 101 for the convenience of the illustration, the weight 103 is actually slidably mounted on a guide bar which is provided in the width direction of the vessel. The hydraulic motor 101, the auxiliary pump 105, the accumulator 108, the tank 109, etc. are mounted on the weight 103.

However, if the conventional hydraulic actuator system is employed in general use, the hydraulic motor 101, the auxiliary pump 105, the accumulator 108 and the tank 109 must be individually prepared, and they are mounted on the weight 103 or a fixed portion of the vessel, then they must be connected to one another by a communication pipe line or a connecting member, thereby needing much time and labor and causing a problem in that the entire apparatus becomes large in size and heavy in weight.

If the communication pipe line becomes long, pressure loss becomes large, which causes another problem in that extra power corresponding to the loss must be supplied.

SUMMARY OF THE INVENTION

The present invention has been made to solve the above problems, and it is an object of the present invention to provide a hydraulic actuator package capable of dispensing with time and labor involved in individually preparing each component for constructing the hydraulic actuator system, and attaching and piping each component, while the system is made small-sized and light weight as a whole.

To achieve the above object, the present invention provides a hydraulic actuator package for use in a hydraulic actuator system comprising a variable displacement hydraulic motor for driving an inertia object with acceleration or deceleration, a speed sensor for detecting a speed of an output shaft of the hydraulic motor, a control valve for continuously varying the capacity of the hydraulic motor, and a control unit for outputting an operation signal to the control valve to permit the speed of the output shaft detected by the speed sensor to conform to an instruction value of the speed.

In the hydraulic actuator package set forth above, the speed sensor is fixed to the output shaft of the hydraulic motor, and the control valve is secured to a casing of the hydraulic motor. An assembling body is formed by integrally assembling an accumulator serving as a hydraulic source of the hydraulic motor and an airtight tank which is capable of varying a bulkhead between itself and sealed gas in response to the amount of stored liquid into a common pedestal. Further, the assembling body is mounted on the casing, and first and second ports of the hydraulic motor communicate with the accumulator and the airtight tank in the casing and the pedestal, and first and second external connection ports are defined in the pedestal or the casing, and they are capable of connecting to the first and second ports from the outside.

Further, it is preferable to house a check valve in the hydraulic actuator package, wherein the check valve is provided between the first external connection port and the first port for permitting an operation fluid to flow freely in the direction from the first external connection port to the first port.

Still further, it is preferable to detachably mount the assembling body formed by integrally assembling the accumulator and the airtight tank into the common pedestal on the casing of the hydraulic motor.

The hydraulic actuator package set forth above further comprises a pump unit mounted on the casing of the hydraulic motor, wherein the pump unit has an electric motor and an auxiliary pump therein, and a discharge port of the pump unit is connected to the first external connection port, and a suction port of the pump unit is connected to the second external connection port.

The pump unit is preferable to be detachably mounted on the casing of the hydraulic motor.

Further, the hydraulic actuator packages set forth above further includes an electromagnetic relief valve which is switchable to unload/onload positions by an electromagnetic actuator and is mounted in the pedestal or the casing of the hydraulic motor, wherein a pressure control port and a drain port of the electromagnetic relief valve can respectively communicate with the first and second ports of the hydraulic motor.

In this case, when the unload/onload switching signals are inputted from the control unit to the electromagnetic actuator, the electromagnetic relief valve can open or close a bypass passage for permitting the first and second ports of the hydraulic motor to communicate with each other.

The above and other objects, features and advantages of the invention will be apparent from the following detailed description which is to be read in conjunct-ion with the accompanying drawings.

DETAILED DESCRIPTION OF THE PREFERRED EMBODIMENTS

A hydraulic actuator package according to a first embodiment of the present invention will now be described in detail with reference to the attached drawings.

Figure 1:
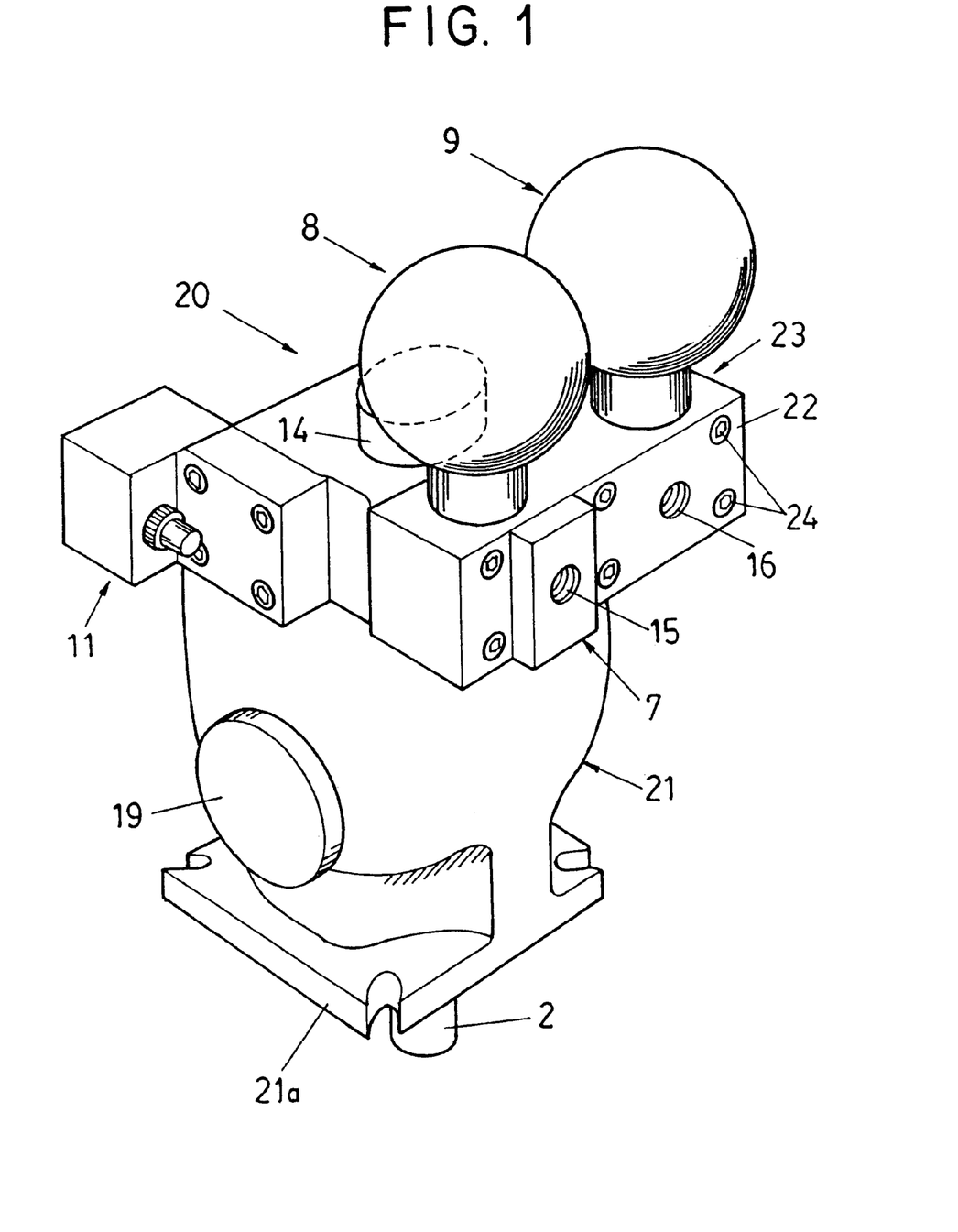
FIG. 1 is a perspective view of a hydraulic actuator package according to a first embodiment of the present invention.
Figure 2:
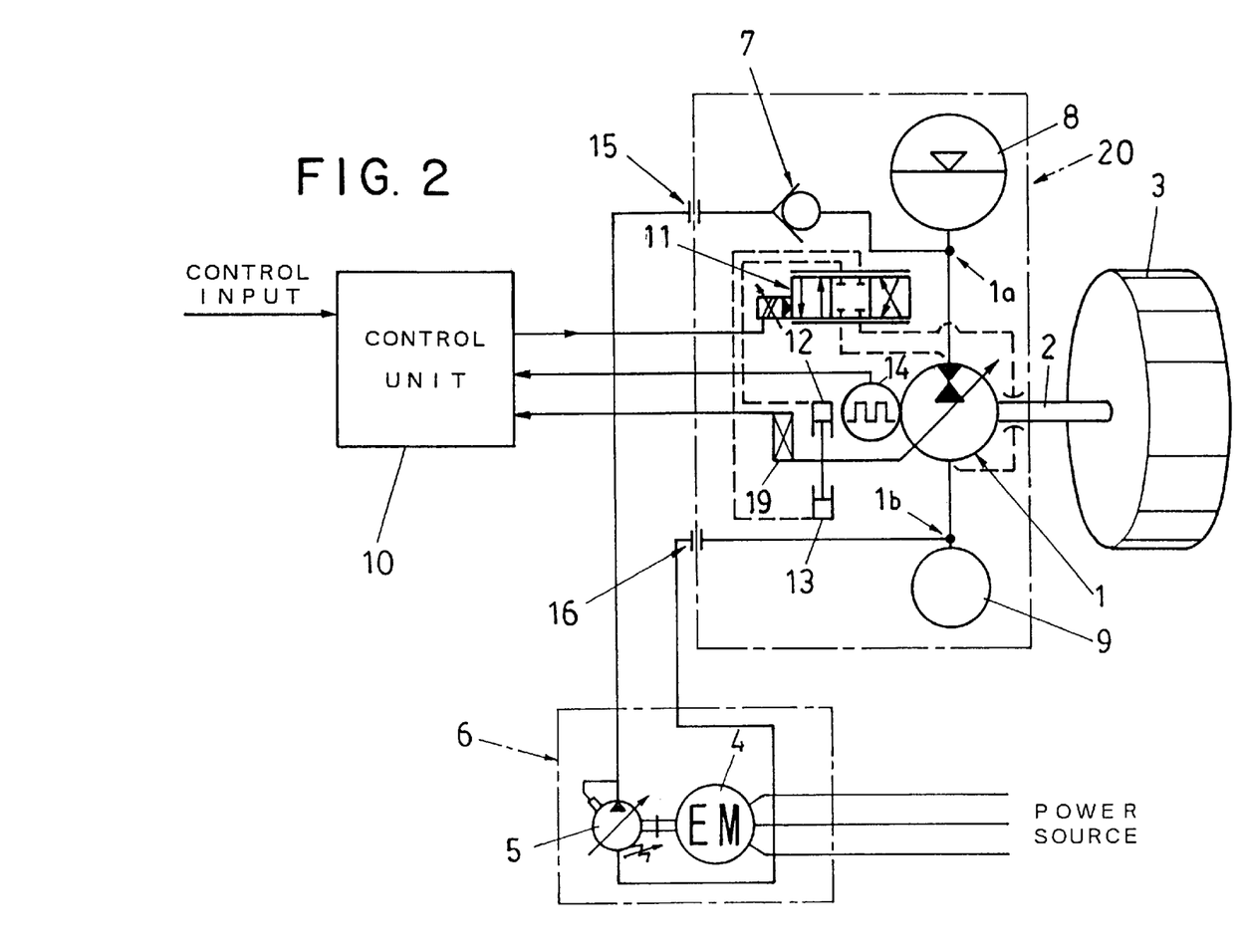
FIG. 2 shows an example of a hydraulic circuit of the hydraulic actuator package in FIG. 1.

FIG. 1 is a perspective view of a hydraulic actuator package according to the first embodiment of the present invention, and FIG. 2 shows an example of a hydraulic circuit of the hydraulic actuator package in FIG. 1.

In FIG. 2, although a weight 3 comprises an inertia object which is mechanically connected to a main shaft 2 of a hydraulic motor 1 wherein the inertia object is driven with acceleration or deceleration (like FIG. 6) for the convenience of illustration, the weight 3 actually comprises various loading apparatuses, and it is connectable to other constituents by a transmission mechanism such as a gear, etc.

In the first embodiment, the portion surrounded by the one dotted and chain line in FIG. 2 is a hydraulic actuator package 20 which comprises a variable displacement hydraulic motor 1 (hereinafter simply referred to as a hydraulic motor 1), an accumulator 8 and an airtight tank 9 serving as a hydraulic source thereof, a closed center type control valve 11 for continuously varying the capacity of the hydraulic motor 1, etc.

A secondary control system comprises the hydraulic actuator package 20, a pump unit 6 connected to the hydraulic actuator package 20 and a control unit 10 for controlling the capacity of the hydraulic motor 1 by way of the control valve 11.

The hydraulic motor 1 is a variable displacement type hydraulic motor such as an inclination plate axial piston motor which is variable positively and negatively, and has a pulse encoder 14 which serves as a speed sensor for generating a pulse signal having a number of pulses corresponding to the revolution speed, which is connected to the rear end portion of the main shaft 2 so as to be fixed to the upper surface of a casing 21 of the hydraulic motor 1 as shown in FIG. 1. The tip end of the main shaft 2 connected to the weight 3 protrudes toward the lower surface of a fixing flange 21a opposite to the upper surface of the casing 21, in FIG. 1, to which the pulse encoder 14 is fixed.

First and second displacement control pistons 12 and 13 for controlling the inclination angle (displacement) of the inclination plate of the hydraulic motor 1 by driving the inclination plate are respectively provided inside the casing 21, and an angle sensor 19 for detecting the inclination angle of the inclination plate is provided to protrude outside the casing 21.

The control valve 11 is secured to the outside of the casing 21. The accumulator 8 and the airtight tank 9 which can vary the position of a bulkhead between itself and a sealed gas in response to the amount of stored liquid are detachably mounted on a common pedestal 22, and they are integrated with each other to form an assembling body 23, which is fixed to the casing 21 of the hydraulic motor.

A first port 1a and a second port 1b of the hydraulic motor 1 are respectively permitted to communicate with the accumulator 8 and airtight tank 9 in the casing 21 of the hydraulic motor and the pedestal 22 as shown in FIG. 2, and a first external connection port 15 and a second external connection port 16 which are respectively connectable to the first port 1a and second port 1b from the outside are respectively defined in the pedestal 22, wherein the first and second external connection ports define female screws in the inner peripheral surfaces thereof.

The first port 1a and second port 1b, the first and second displacement control pistons 12 and 13 are respectively connected with each port of the control valve 11 by pilot lines inside the casing 21.

A discharge port and a suction port of a pump unit 6 comprising an auxiliary pump 5 to be driven by an electric motor 4 having a low power are respectively connected to the first external connection port 15 and second external connection port 16 from the outside.

A check valve 7 is provided between the first external connection port 15 and the first port 1a for permitting an operation fluid to flow freely in the direction from the first external connection port 15 to the first port 1a.

An operation fluid under high pressure is supplied from the pump unit 6 to the first port 1a defined in the variable displacement hydraulic motor 1 by way of the check valve 7 while the operation fluid under high pressure from the accumulator 8 having a pressure which is greater than the given pressure is directly supplied to the first port 1a, so that the operation fluid having more than the given pressure is returned from the second port 1b to the airtight tank 9.

The volume of the hydraulic motor 1 is controlled by the first and second displacement control pistons 12 and 13 which operate by way of the control valve 11 in response to the operation signal from the control unit 10.

The control unit 10 is connected to the hydraulic actuator package 20 by way of a connector and a connecting cable, not shown, and receives a control instruction or input from the outside, receives a pulse signal from the pulse encoder 14 and an angle detecting signal from the angle sensor 19, and outputs the operation signal to the control valve 11. As a result, the operation signal is outputted to the control valve 11 so that a detecting value of the speed of the shaft which is obtained by subjecting the pulse signal from the pulse encoder 14 to an F/V conversion conforms to a speed instruction value or input value, thereby varying the inclination of the inclination plate of the hydraulic motor 1 so as to control the capacity thereof.

At this time, the control unit 10 controls the capacity of the hydraulic motor 1 in a manner such that the inclination of the hydraulic motor 1 becomes zero as nearly as possible in a state where the speed of the shaft conforms to the instruction value, e.g., in the normal condition of the load of the inertia alone referring to the angle value corresponding to a torque (degree of acceleration) in response to the detecting signal from the angle sensor 19. As a result, it is possible to enhance the stability of the control. However, the capacity of the hydraulic motor can be controlled even if there is no detection signal from the angle sensor 19.

According to the secondary control system having the aforementioned construction, fluid under pressure is supplied to the hydraulic actuator package 20 by the auxiliary pump 5 of the pump unit 6, and it is accumulated under pressure in the accumulator 8. When the hydraulic motor 1 operates, necessary energy is supplied from the accumulator 8, and the kinetic energy of the weight 3 is collected by the accumulator 8 when braking of the hydraulic motor 1 stops. The power necessary for driving the weight 3 during the motion is only that required for the operation of the capacity of the hydraulic motor 1, except for leakage loss of the operation fluid and friction loss by driving, and energy corresponding to that power is supplied from the auxiliary pump 5.

In this system as set forth above, since braking energy is effectively recycled and instantaneously needed energy is supplied from the accumulator 8, only low power need be supplied constantly from the power source to the electric motor 4 of the pump unit 6, thereby fulfilling a stepless gear change function which is the characteristic of the hydraulic apparatus as well as saving energy.

In the first embodiment, the operation fluid from the second port 1b of the hydraulic motor 1 is not returned to a tank which is vented to the atmosphere but is returned to the airtight tank 9. A sealed gas ($N_2$ gas) having a pressure (e.g., 0.12 MPa: Mega Pascal) which is significantly lower than the pressure in the accumulator 8 (e.g., 4 MPa) is sealed in advance in the airtight tank 9, which does not permit the airtight tank 9 to show the accumulation effect.

However, if the inertia object exemplified by the weight 3 in FIG. 2 is braked, the energy of the accumulator 8 is almost entirely converted into the kinetic energy of the inertia object so that a large amount of operation fluid is present in the airtight tank 9, thereby increasing the pressure inside the airtight tank 9. At this time, since the hydraulic motor 1 performs a pumping operation, the hydraulic motor 1 can easily draw in the operation fluid when the pressure of the airtight tank 9 connected to the second port 1b corresponding to the suction port increases.

Supposing that the inner pressure of the airtight tank 9 increases to 0.2 MPa, the amount of suction pressure decrease will be doubled compared with a state where the tank is vented to the atmosphere, and the suction condition is drastically improved.

Since the accumulating capacity of the accumulator 8 relates to kinetic energy or potential energy of the inertia object, it must be selected to conform to the driving apparatus. Accordingly, when the hydraulic actuator package 20 is used for a general purpose, the liquid actuator package 20 should be capable of connecting accumulator 8 having various capacities. Further, since the capacity of the airtight tank 9 depends on the capacity of the accumulator 8, an assembling body 23 formed by integrating the airtight tank 9 and the accumulator 8 is prepared, and the assembling body 23 is detachably mounted to the casing 21 of the hydraulic motor as an attachment.

In the first embodiment shown in FIG. 1, the accumulator 8 and the airtight tank 9 are integrally assembled onto the upper portion of the pedestal 22 to form the assembling body 23, and the pedestal 22 is firmly secured to the casing 21 of the hydraulic motor by a plurality of fixing bolts 24 wherein the control valve 11 is fixed to the casing 21, and the check valve 7 is provided to be housed in the side surfaces of the pedestal 22, while the first external connection port 15 and second external connection port 16 are respectively defined in the side surfaces of the check valve 7 and the pedestal 22. Connectors of the tube to which the discharge port and the suction port of the pump unit 6 shown in FIG. 2 are connected are screwed into the first and second external connection ports 15 and 16 or detachably mounted thereto by a known one-touch quick coupler.

In FIG. 1, although the first and second external connection ports 15 and 16 are defined in the side surface of the pedestal 22 of the assembling body 23, they may be defined in the casing 21 of the hydraulic motor.

In the hydraulic actuator package 20, only the discharge port and the suction port of the auxiliary pump 5 may be connected to the first and second external connection ports 15 and 16, thereby reducing time and labor involved in the design of the hydraulic circuit and in the piping operation. Further, since the accumulator 8 and the airtight tank 9 are integrated with each other as the assembling body 23, it is not necessary that they are individually selected.

Figure 3:
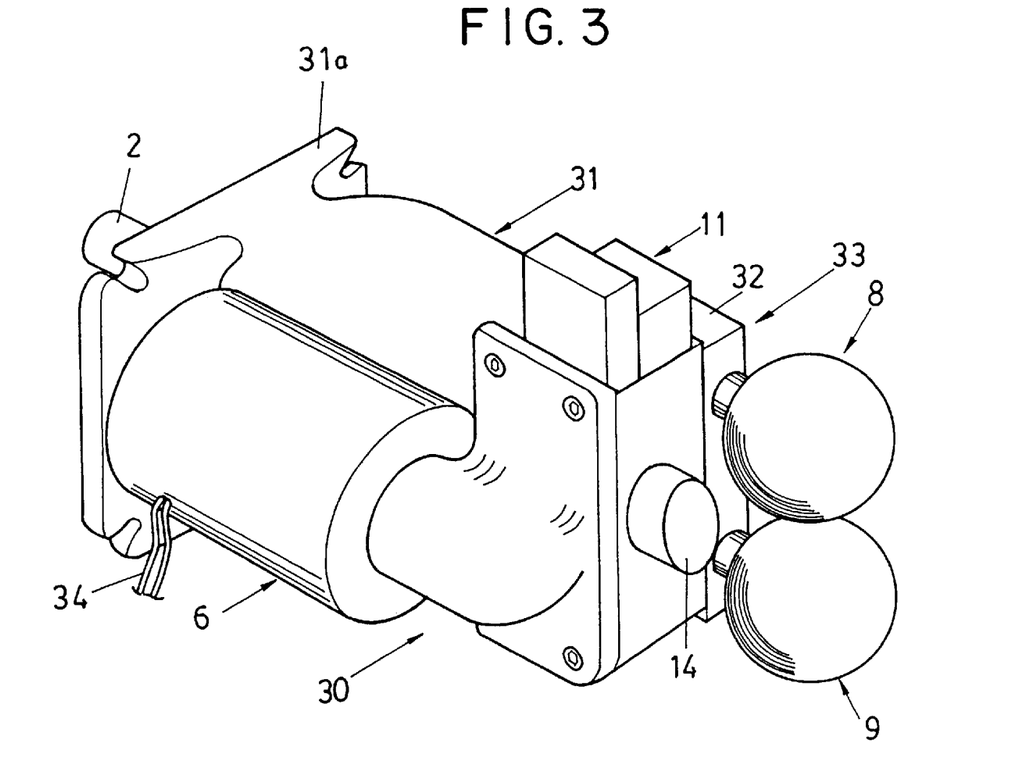
FIG. 3 is a perspective view of a hydraulic actuator package according to another embodiment of the present invention.

A hydraulic actuator package according to a second embodiment of the present invention will be now described with reference to FIG. 3 showing the external appearance thereof.

A hydraulic actuator package 30 comprises an assembling body 33 formed by fixing an accumulator 8 and an airtight tank 9 onto a pedestal 32, and a control valve 11 and a casing 31 of a hydraulic motor to which the assembling body 33 and the control valve 11 are secured. Further, a pump unit 6 shown in FIG. 2 is also integrally secured to the casing 31, whereby a discharge port and a suction port of an auxiliary pump 5 of the pump unit 6 are directly connected to the first and second external connection ports defined in the casing 31, so that problems involved in piping therebetween can be avoided and the hydraulic actuator package 30 can be installed in a location where the piping is usually difficult to build. The casing 31 has a fixing flange 31a from which the main shaft 2 of the hydraulic motor 1 as shown in FIG. 2 protrudes, and a pulse encoder 14 is attached to the side opposite thereto.

In the second embodiment, although not shown, the check valve 7 shown in FIG. 2 is housed in a connecting portion between the pump unit 6 and the casing 31.

Since the pump unit 6 may have a small power supply, a thin power supply line 34 to the electric motor 4 needing remote control is sufficient as described above, the cost for installing the hydraulic actuator package 30 can be drastically reduced. Also, the hydraulic actuator package 30 can be installed in a spot where power supply facilities have only a small capacity. As a result of a test, for example, it is confirmed that a power supply may be about 1 kW if an instantaneous output power of the hydraulic motor 1 is 6 kW.

Since the pump unit 6 is integrated with the hydraulic actuator package 30, the trouble involved with the connection therebetween is not encountered, and also the size of the pump unit 6 may be reduced so as to permit the hydraulic actuator package to be quite small sized and light weighted. Still further, owing to the miniaturization of the auxiliary pump 5 and the operation of the accumulator 8, there is no influence due to the pulsation, thereby making it possible to reduce the usual noise and vibration.

Figure 4:
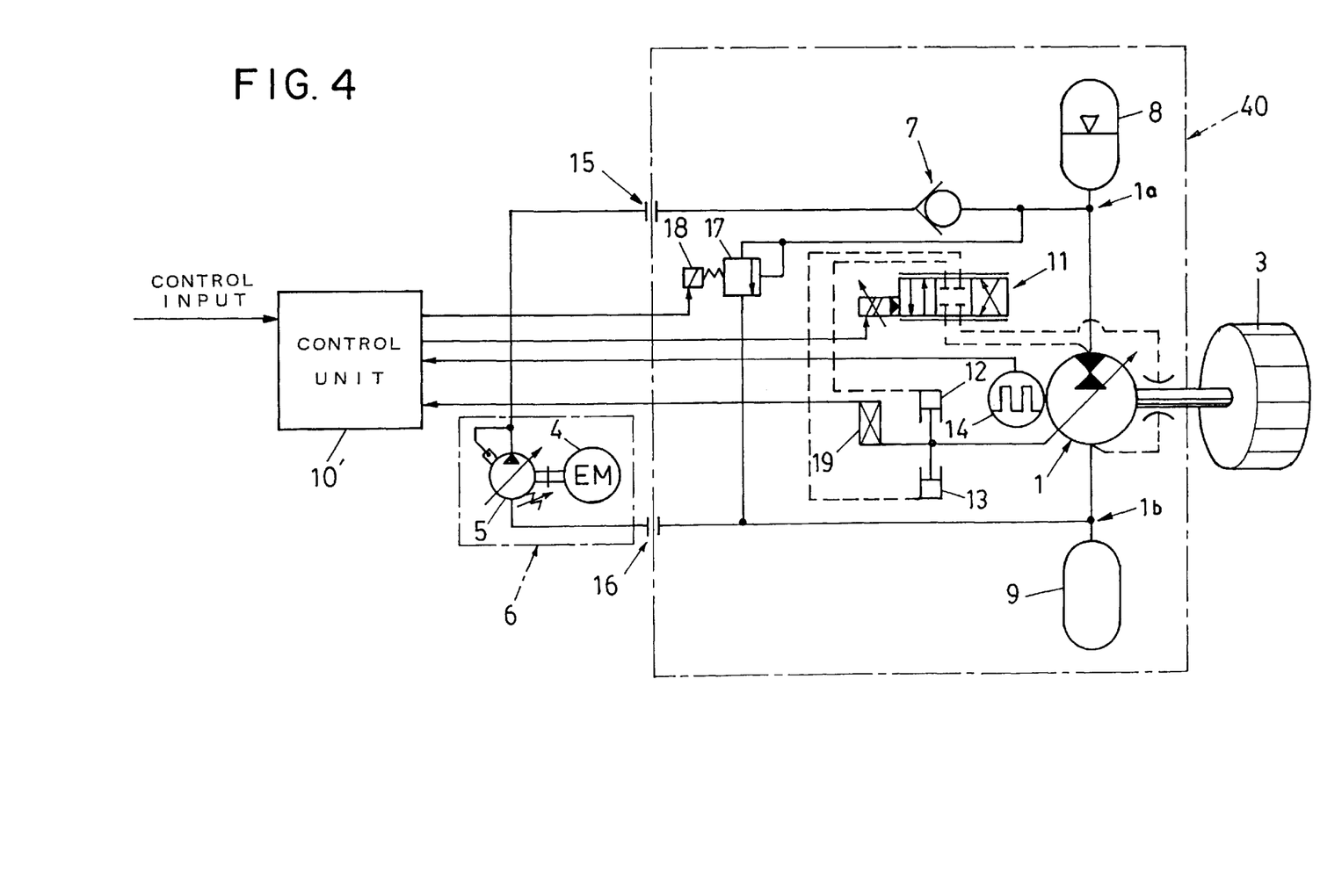
FIG. 4 shows an example of a hydraulic circuit of the hydraulic actuator package like FIG. 2 according to a third embodiment of the present invention.

FIG. 4 shows a hydraulic circuit like FIG. 2 according to another embodiment of the present invention.

A hydraulic actuator package 40 of this embodiment has a bypass passage which communicates with a pressure control port and a drain port of an electromagnetic relief valve 17 between the first port 1a and second port 1b of the hydraulic motor 1 in addition to the construction of the hydraulic actuator package 20 shown in FIG. 2, wherein an unload and an onload position of the electromagnetic relief valve 17 can be switched by an electromagnetic actuator (solenoid) 18.

When the unload/onload switching signal is inputted from a control unit 10' to the electromagnetic actuator 18, the electromagnetic relief valve 17 opens or closes the bypass passage for permitting the first port 1a and second port 1b to communicate with each other.

Figure 5:
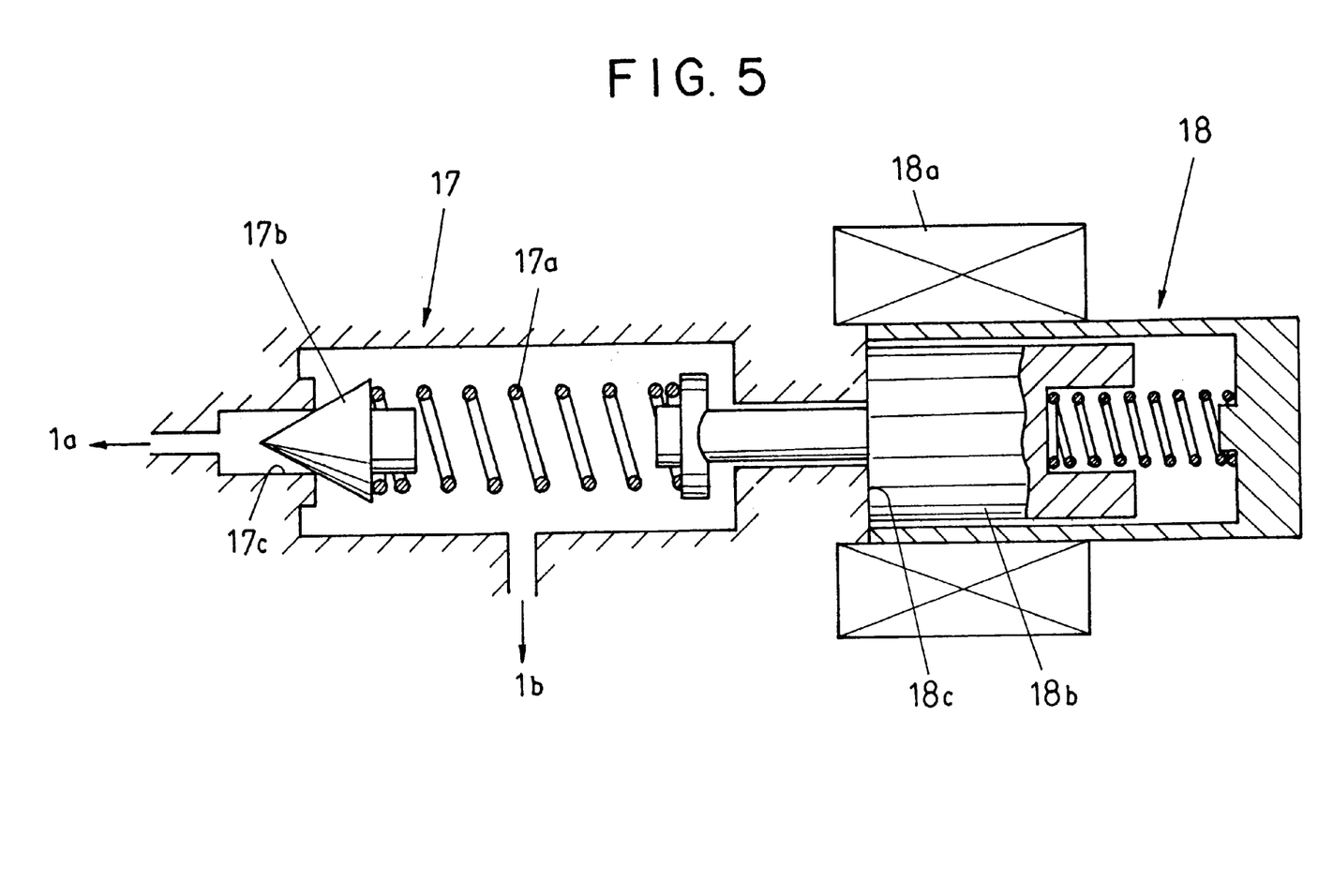
FIG. 5 is a cross sectional view showing an example of a construction of an electromagnetic relief valve 17 in FIG. 4.

FIG. 5 is a cross sectional view showing an example of an electromagnetic relief valve 17 capable of switching to the unload/onload positions or conditions. When no current flows to a coil 18a of the electromagnetic actuator 18, a plunger 18b is not attracted by a pole face 18c so that a needle valve 17b of the electromagnetic relief valve 17 moves back rightward in the same figure by the pressure from the first port 1a so as to communicate with the second port 1b, thereby permitting the electromagnetic relief valve 17 to be in the unload condition.

When the current flows to the coil 18a of the electromagnetic actuator 18, the plunger 18b is attracted by the pole face 18c. As a result, the needle valve 17b is pressed against a seat 17c by way of a spring 17a of the electromagnetic relief valve 17, thereby shutting off the communication from the first port 1a to the second port 1b, so that the pressure of the first port 1a increases.

Although this pressure can increase until it can exceed the urging force of the spring 17a which is compressed when the plunger 18b is attracted by the pole face 18c, the needle valve 17b moves rightward against the urging force of the spring 17a if this pressure exceeds the urging force, to open the bypass passage, thereby preventing the pressure from increasing further. In other words, the pressure of the first port 1a does not increase beyond a given pressure, thereby maintaining the safety of the hydraulic actuator package 40.

However, in a hydraulic actuator package of the dispersion installing type, the amount of operation fluid in the airtight tank 9 corresponds to the capacity of the accumulator 8 so that the electromagnetic relief valve 17 scarcely performs the relief operation as set forth above. Accordingly, limited to such a case, it may be considered that it is enough to employ a valve to merely switch the communication and shut-off between the first port 1a and second port 1b instead of the electromagnetic relief valve 17. However if such a valve is employed, the operation fluid accumulating in the accumulator 8 is instantaneously released to the airtight tank 9 and the hydraulic motor 1 due to switching, thereby causing a problem of damaging the hydraulic actuator package, and hence it is not preferable to be employed.

As the unload/onload switchable type electromagnetic relief valve 17, a screw-in-type which may be easily mounted by being screwed into a screw hole defined in the casing of the hydraulic motor, etc., is available at low cost, and the external appearance of the hydraulic actuator package into which the electromagnetic relief valve 17 is screwed is not different very much from the external appearances of those of the first to third embodiments as shown in FIGS. 1 and 3, and hence the external appearance of the hydraulic actuator package is omitted.

The electromagnetic relief valve 17 may be a gasket type instead of the screw-in type, and also it may be replaced by a proportional electromagnetic relief valve capable of controlling the pressure in proportion to the current value using a proportional solenoid.

As mentioned above, the hydraulic actuator package according to the present invention comprises the variable displacement hydraulic motor, the control valve thereof, the accumulator serving as the hydraulic source, the air-tight tank, etc., which are integrated with one another and which are housed in or integrally mounted on the casing of the hydraulic motor, and further, the first and second external connection ports which may be connected to the pipe line for communicating between these components and the first and second ports of the hydraulic motor from the outside are provided to the casing of the hydraulic motor or the pedestal integrated with the casing of the hydraulic motor, so that the trouble in preparing each component individually and piping therefor may be omitted, and also the pressure losses generated in the tube lines can be reduced to enhance the saving of energy.

Still further, the instantaneous power can be supplied in the package, the secondary controlling system can be quite small-sized and light-weight so that the installing cost of the hydraulic actuator package can be reduced.

In the hydraulic actuator package of the present invention, since the check valve is incorporated between the first port and the first external connection port of the hydraulic motor, thereby eliminating the trouble involved in the selection of the check valve and the piping thereof, and also since the accumulator and the airtight tank can be detachably mounted on the casing of the hydraulic motor as an integrated assembling body, the individual selection of these components and the connection thereof can be eliminated.

Still further, the pump unit is integrally provided in the casing of the hydraulic motor, wherein the discharge port of the pump unit is directly connected to the first external connection port and the suction port of the pump unit is directly connected to the second external connection port so that problems involved in the piping between the hydraulic motor and the pump unit can be avoided, and the hydraulic actuator package can be installed in the spot where the piping is usually difficult to build or install a location.

Since the pump unit can be detachably connected to the casing of the hydraulic motor, the general use of the hydraulic actuator package can be further enhanced.

Still more further, in the hydraulic actuator package of the present invention, since the bypass passage is formed between the first and second ports of the hydraulic motor by the electromagnetic relief valve which can be selected to the unload and onload positions, fluid energy accumulated in the accumulator can be safely vented.

What is claimed is:

1. A hydraulic actuator package for use in a hydraulic actuator system comprising a variable displacement hydraulic motor for driving an inertia object with acceleration or deceleration, a speed sensor for detecting a speed of an output shaft of the hydraulic motor, a control valve for continuously varying the capacity of the hydraulic motor, and a control unit for outputting an operation signal to the control valve to permit the speed of the output shaft detected by the speed sensor to conform to an instruction value of the speed,     wherein said speed sensor is fixed to the output shaft of the hydraulic motor, and the control valve is fixed to a casing of the hydraulic motor;

said hydraulic actuator package further comprises an assembling body formed by integrally assembling an accumulator serving as a hydraulic source of the hydraulic motor and an airtight tank capable of varying a position of a bulkhead between itself and a sealed gas in response to the amount of stored liquid into a common pedestal, said assembling body being mounted on said casing;

first and second ports of the hydraulic motor communicate with the accumulator and the airtight tank in the casing and the pedestal, and     first and second external connection ports are defined in the pedestal or the casing, and are capable of being connected to the first and second ports from the outside.

2. The hydraulic actuator package according to claim 1, further comprising a check valve provided between the first external connection port and the first port for permitting an operation fluid to flow freely in the direction from the first external connection port to the first port.

3. The hydraulic actuator package according to claim 1, wherein the assembling body formed by integrally assembling the accumulator and the airtight tank into the common pedestal is detachably mounted on the casing of the hydraulic motor.

4. The hydraulic actuator package according to claim 2, further comprising a pump unit mounted on the casing of the hydraulic motor, said pump unit having an electric motor and an auxiliary pump therein;

wherein a discharge port of the pump unit is connected to the first external connection port, and a suction port of the pump unit is connected to the second external connection port.

5. The hydraulic actuator package according to claim 4, wherein the pump unit is detachably mounted on the casing of the hydraulic motor.

6. The hydraulic actuator package according to claim 1, further including an electromagnetic relief valve which is switchable to unload/onload positions by an electromagnetic actuator, said electromagnetic relief valve being mounted on the pedestal or the casing of the hydraulic motor, wherein a pressure control port and a drain port of the electromagnetic relief valve communicate with the first and second ports of the hydraulic motor.

7. The hydraulic actuator package according to claim 6, wherein the electromagnetic relief valve is a valve for opening and closing a bypass passage for permitting the first and second ports of the hydraulic motor to communicate with each other when unload/onload switching signals issued from the control unit are inputted to the electromagnetic actuator.

\* \* \* \* \*